United States Patent
Andreev et al.

(10) Patent No.: US 7,072,922 B2
(45) Date of Patent: Jul. 4, 2006

(54) INTEGRATED CIRCUIT AND PROCESS FOR IDENTIFYING MINIMUM OR MAXIMUM INPUT VALUE AMONG PLURAL INPUTS

(75) Inventors: Alexander E. Andreev, San Jose, CA (US); Anatoli A. Bolotov, Cupertino, CA (US); Igor Vikhliantsev, Sunnyvale, CA (US)

(73) Assignee: LSI Logic Corporation, Milpitas, CA (US)

( * ) Notice: Subject to any disclaimer, the term of this patent is extended or adjusted under 35 U.S.C. 154(b) by 623 days.

(21) Appl. No.: 10/319,219

(22) Filed: Dec. 13, 2002

(65) Prior Publication Data

US 2004/0117416 A1 Jun. 17, 2004

(51) Int. Cl.
*G06F 15/00* (2006.01)
(52) U.S. Cl. .................................................... 708/207
(58) Field of Classification Search ................ 708/207, 708/671
See application file for complete search history.

(56) References Cited

U.S. PATENT DOCUMENTS 4,998,219 A * 3/1991 Frauenglass ................ 708/207
5,721,809 A * 2/1998 Park .............................. 706/4
6,931,424 B1 * 8/2005 Joseph ........................ 708/207

OTHER PUBLICATIONS

Timing-Driven Logic Bi-Decomposition', Jun. 2003, IEEE Transactions on Computer-Aided Design of Integrated Circuits, vol. 22, iss.6, pp. 675-685—Author(s)—Cortadella.

* cited by examiner

*Primary Examiner*—Chuong D. Ngo

(74) *Attorney, Agent, or Firm*—Westman, Champlin & Kelly, P.A.

(57) ABSTRACT

Apparatus and process identifies a maximum or minimum value among a plurality of binary values on a plurality of a-bit wide wires in an integrated circuit module. An N-bit vector K is calculated based on n most significant bits of all a-bit binary signals, where $N=2^n$. M N-bit vectors $K\_0, \ldots, K\_(M-1)$ are calculated based on the n most significant and the m least significant bits of all a-bit binary signals, where M is at least $2^m-1$. A table is constructed from vectors $K\_0, \ldots, K(M-1)$ to create table vectors. A table vector is selected based on vector K, is used to derive a vector P, which in turn is used to select another table vector. The minimum or maximum binary value is identified from the two selected table vectors.

20 Claims, 3 Drawing Sheets

INTEGRATED CIRCUIT AND PROCESS FOR IDENTIFYING MINIMUM OR MAXIMUM INPUT VALUE AMONG PLURAL INPUTS

FIELD OF THE INVENTION

This invention relates to integrated circuit chips (ICs), and particularly to an IC module of minimum depth that identifies the minimum or maximum input value among a plurality of inputs.

BACKGROUND OF THE INVENTION

Integrated circuit chips (ICs) include cells, such as transistors, capacitors and other devices grouped into plural modules to perform specific logic and arithmetic functions, such as comparators, adders, inverters and other functions. The modules are represented as standard designs in technology-specific circuit libraries, and the IC is constructed using selected modules and millions of cells. One such circuit used in IC chips is one that identifies the minimum or maximum binary value on a wire of a wire array. It is important for some operations to know the maximum or minimum binary value appearing on a wire of a wire array at a given clock cycle.

Consider an RLT-Verilog description of a circuit module that identifies a minimum value on an a-bit wide wire, W_S, of an 8-wire array, and supplies an output, Z, that represents the minimum binary value carried on a wire, as follows:

Input[2:0] W_1,W_1,W_3,W_4,W_5,W_6,W_7,W_8;
Output[2:0] Z;
/*
* [Here, the module is described in a gate level
* implementation in terms of Verilog primitives,
* AND, OR and NOT.]
*/
endmodule.

It would be useful to certain operations carried out by the chip to identify the minimum (or maximum) value carried by a wire W_s at a given clock period.

Timing parameters of a circuit play an important role in the synthesis of the IC design. Typically, circuits for identifying the maximum of minimum binary value on a wire of a wire array require a tree of a-bit comparators. One characteristic of the tree is its depth as a function of its input parameters. The depth of the tree is the length of the maximal path between its root and its leaves. The depth of the tree is equal to the number of levels in the tree minus one. In the case of a tree of comparators, the depth of the tree increases with each bit in the wire widths and also, possibly, with the number of wires in the array. Since the time required by the circuit to complete an operation is directly related to the depth of the circuit, each bit of the wire width in a wire array, along with the number of wires in the wire array, increases the time required for the tree to complete its operation. Consequently, there is a need for a circuit and process to calculate the minimum (or maximum) binary value on an a-bit wire of a set S of wires with possibly minimum depth.

SUMMARY OF THE INVENTION

The present invention is directed to a circuit and process, of minimal or optimal depth, for finding a minimum or maximum value, W_min or W_max, carried by a set, S, of a-bit wires W_i.

In a first embodiment, a minimum value is identified among a plurality of values represented by respective a-bit binary signals on a plurality of a-bit wide wires in an integrated circuit module. An N-bit vector K is calculated from the n most significant bits of all a-bit binary signals, where a=n+m, N=$2^n$ and m is either a/2 or (a−1)/2. M N-bit vectors K_0, . . . ,K_(M−1) are calculated from the n most significant and the m least significant bits of all a-bit binary signals, where M is at least $2^m$−1. Table vectors V_0, . . . , V(N−1) are calculated from using a table containing vectors K_0, . . . ,K(M−1) and one of the table vectors V_0, . . . , or V(N−1) is selected based on vector K using a hierarchical tree. An n-bit value, x_min, is identified from the selected table vector and a vector P is derived from the selected table vector.

A table containing an m-bit portion based on an order of values commencing with 0 is used to calculate table vectors U_0, . . . ,U_(N−1). One of the table vectors U_0, . . . , or U(N−1) is selected (U_i) based on vector P using a hierarchical tree. An m-bit value, y_min, is identified from the selected table vector U_i. The minimum binary value is identified from the x_min and y_min values.

In some embodiments, the circuit is constructed to identify the maximum binary value in a similar (dual) manner as the circuit to identify minimum binary values. In other embodiments, the maximum binary value is identified by inverting the input a-bit binary signals, computing the minimum binary value, and inverting the computed minimum binary value to derive the maximum binary value.

In a second embodiment, an integrated circuit identifies the minimum or maximum value among a plurality of values represented by respective a-bit signals on a plurality of a-bit wires in the IC chip. The circuit has an asymptotically minimal depth in the chip of $$2\log S + \frac{5}{2}a.$$

DETAILED DESCRIPTION OF THE PREFERRED EMBODIMENTS

Figure 1:
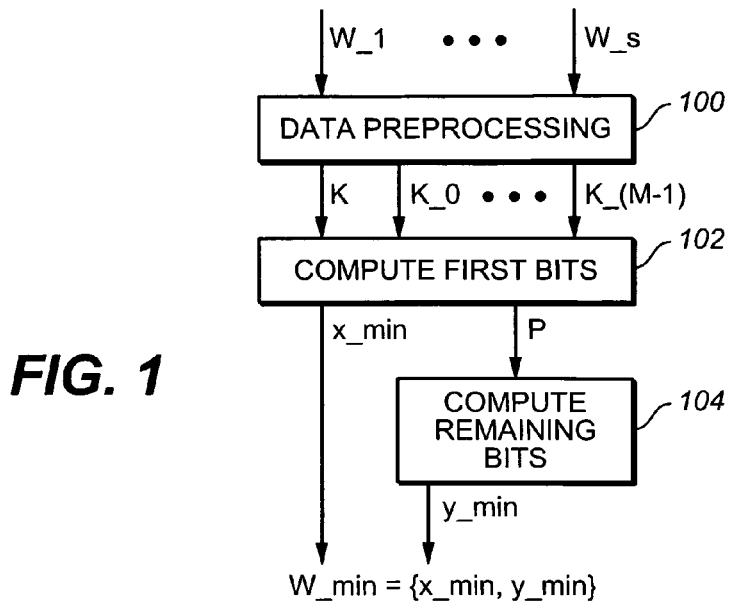
FIG. 1 is a block diagram of a circuit for computing a minimum binary value on a wire of a set of wires.

FIG. 1 is a block diagram of a circuit that calculates a minimum binary value, W_min, carried by an a-bit input wire of a wire array A consisting of a plurality of wires W_1,W_2, . . . ,W_s. (As will be explained in greater detail below, computation of W_max is accomplished in a similar manner.) The circuit comprises three principal processors 100, 102 and 104. The circuit computes the minimal (or maximal) value represented by binary signals carried by a wire in array A, W_min=minA, W_max=maxA.

Processor 100 receives the input binary values carried by each wire of wire array A, and computes vectors K, K_0, . . . ,K_(M−1). Processor 102 computes x_min and a vector P from vectors K, K_0, . . . ,K_(M−1), and processor 104 computes y_min from vectors P, K_0, . . . ,K_(M−1). The values of x_min and y_min are concatenated to generate W_min (W_min=x_min,y_min).

Figure 2:
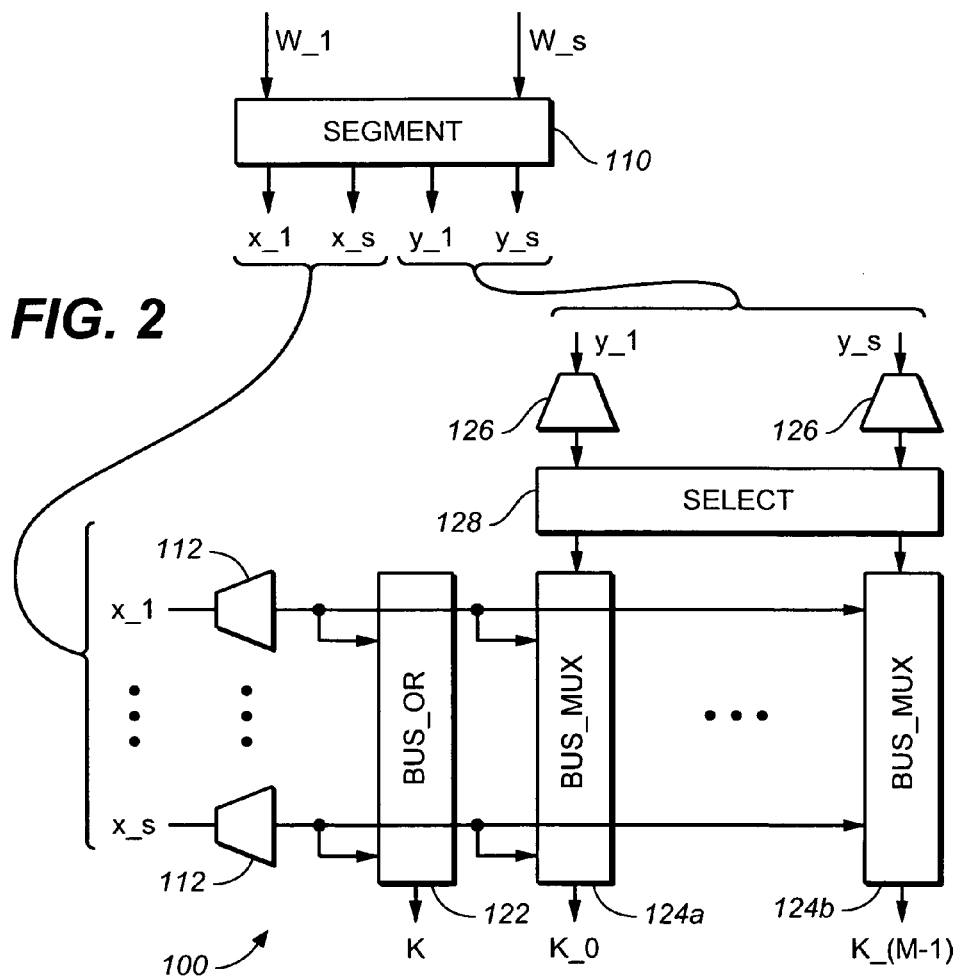
FIG. 2 is a block diagram of a first processor employed in the circuit shown in FIG. 1.

Processor 100 is illustrated in greater detail in FIG. 2. Input wire array A consists of S a-bit wires W_1,W_2, . . . ,W_s, A={W_1,W_2, . . . ,W_s}. The binary signals carried by the wires can be considered as a-bit vectors W_1,W_2, . . . ,W_s. Module 110 receives input vectors W_1,W_2, . . . ,W_s, and segments them into two halves, n-bit vectors x_1,x_2, . . . ,x_s, (representing the n most significant bits on the respective wire) and m-bit vectors y_1,y_2, . . . ,y_s (representing the bits of the m least significant bits on the respective wire), where n=a−m. Each vector W_i is the concatenation of the x_i and y_i vectors (x_i, y_i), where i=1,2, . . . ,s. If a is an even integer, m=a/2 and n=m; if a is an odd integer, then m=(a−1)/2 and n=m+1. Thus, bits 1 . . . m of each input vector W_1,W_2, . . . ,W_s are the m bits of vectors y_1,y_2, . . . ,y_s, and bits (m+1).a are the n-bits of vectors x_1,x_2, . . . ,x_s. Vectors x_1,x_2, . . . ,x_s are input to individual modules 112 and vectors y_1,y_2, . . . ,y_s are input to individual modules 126.

Each module 112 receives a respective n-bit vector x_1, x_2, . . . ,x_s (bits (m+1) . . . a of respective input vectors W_1,W_2, . . . ,W_s) and provides an output representing the $2^n$ conjunctions of the n input bits. Thus, each module 112 codes the respective n-bit input vector x_i to a $2^n$-bit output vector kx_i having a "1" in the position representing the decimal value of x_i. The positions in kx_i are numbered from right to left starting with 0. For example, for n=2 if x_i is binary 01=decimal 1, then kx_i=0010; if x_i is 10=2 then kx_i=0100. Modules 112 supply the s output vectors kx_1, kx_2, . . . ,kx_s to module 122.

Vectors kx_1,kx_2, . . . ,kx_s are input to module 122, which performs disjunction operation to provide an N-bit vector K=kx_1vkx_2v . . . vkx_s, where N=$2^n$. The disjunction operation ORs the corresponding bits of vectors kx_1, kx_2, . . . ,kx_s for each bit position. Vector K is output to processor 102. Vectors kx_1,kx_2, . . . ,kx_s are also input to BUS_MUX modules 124. There are M modules 124, where M=$2^m$−1.

Consider the example of four 4-bit input wires carrying binary signals W_1=1100, W_2=1001, W_3=0101 and W_4=1010. In this case, S=4 and a=4, so n=m=2, N=$2^n$=4 and M=$2^m$−1=3. The example is a simple one; in practice, the number of bits, a, is essentially smaller than the number of wires, S. Therefore, for a value of a=4, the number of wires, S, will be significantly greater than 4, such as 30, 32, etc. Thus, the example of S=4 is chosen for sake of simplicity of explanation of the invention. If in practice S=4, a more straight-forward technique of a tree of 4-bit comparators would be employed.

For the above example, module 110 computes x_1=11, x_2=10, x_3=01 and x_4=10. Module 112 calculates 4-bit outputs kx_1=1000, kx_2=0100, kx_3=0010 and kx_4=0100. BUS_OR module 122 calculates vector K as the disjunction of 1000v 0100v 0010v 0100, resulting in K=1110. Vector K is output by module 122 to processor 102 (FIG. 1).

Modules 126 operate in a manner similar to modules 112. Each module 126 receives a respective m-bit vector y_1, y_2, . . . ,y_s (bits 1 . . . m of respective input vectors W_1,W_2, . . . ,W_s) and provides an output representing the $2^m$ conjunctions of the m input bits. Thus, each module 126 codes the m-bit input vector y_i to a $2^m$-bit output vector ky_i having a "1" in the position representing the decimal value of y_i, similar to the construction of vectors kx_i by modules 112. Select signals, select_i are generated by select module 128 from vectors ky_i. More particularly, each select signal is generated as a concatenation of corresponding bits of vectors ky_i, starting with the least significant bit. In the example where y_1=00, y_2=01, y_3=01 and y_4=10, module 126 calculates the 4-bit vectors as ky_1=0000, ky_2=0010, ky_3=0010 and ky_4=0100. Module 128 generates the select signals, starting with the least significant bits in vectors ky_i, as select_0=0000, select_1=0110 and select_2=0001. (While this process would also calculate select_3=0000, it is not necessary to calculate a select_3 value for reasons explained below.)

Each module 124 performs a disjunction of selected vectors kx_i, selected on the basis of the respective select signal. The result is a respective vector K_0, . . . ,K_(M−1). More particularly, if a select bit is 1, the corresponding vector kx_i from modules 112 is selected for disjunction; if the select bit is 0, the corresponding vector kx_i is not selected for disjunction. If a select signal is all 0s, no kx_i vector is selected and the corresponding output vector is all 0s.

In the example, kx_1=1000, kx_2=0100, kx_3=0010 and kx_4=0100, and select_0=0000, select_1=0110 and select_2=0001. Consequently, module 124 that calculates vector K_0 operates on select_0=0000 to provide vector K_0=0000. Module 124 that calculates vector K_1 operates on select_1=0110 to select vectors kx_2 and kx_3 to perform 0100v 0010 to provide vector K_1=0110. The module 124 that calculates K_2 selects vector kx_4 to calculate K_2=kx_4=0100. Consequently, the outputs of processor 100 (for the example) are:

K=1110
K_0=0000
K_1=0110
K_2=0100.

Processor 100 thus receives the input wire array A and provides N-bit vectors K,K_0, . . . ,K_(M−1). The depth of processor 100 is equal to n+2 log S.

Figures 3, 4:
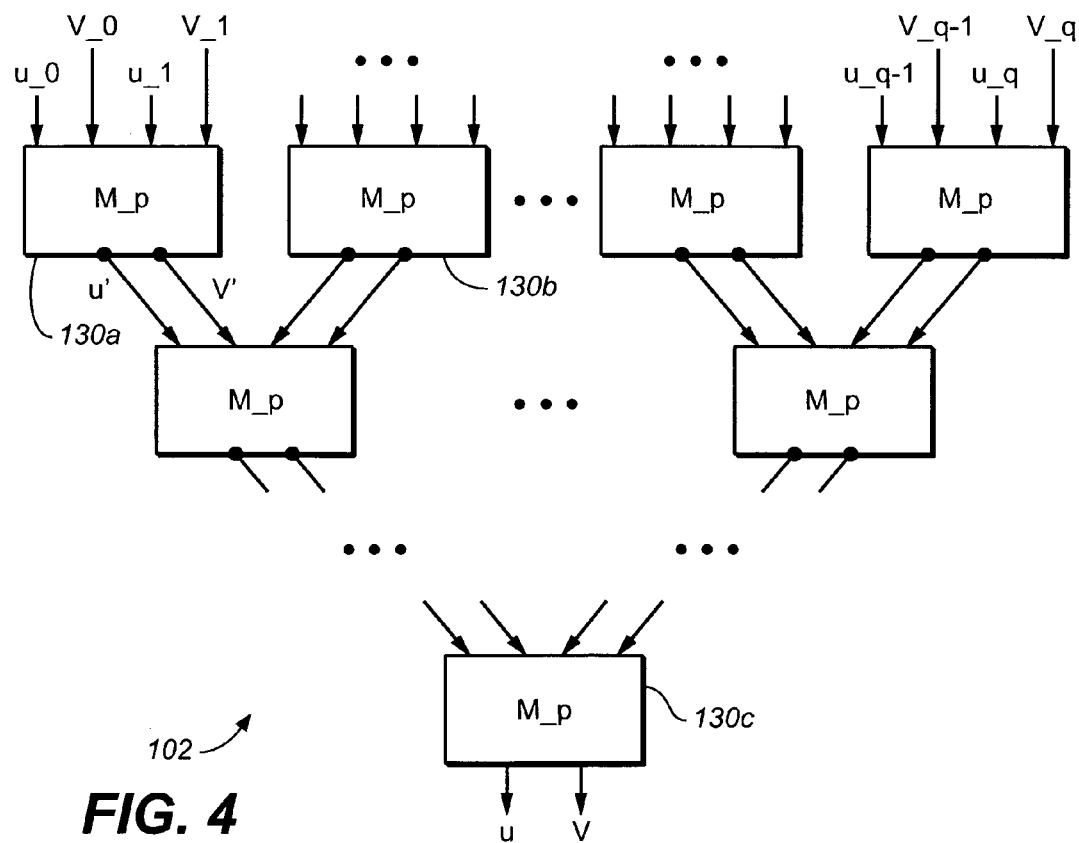
FIG. 3 is a diagram of a table used in second and third processors of the circuit illustrated in FIG. 1.
FIG. 4 is a block diagram of a tree used in the second processor of the circuit shown in FIG. 1.

Processor 102 receives vectors K,K_0, . . . ,K_(M−1). Processor 102 includes an N×p table, where p=n+M, formed from binary values 0 and 1 and vectors K_0, . . . ,K_(M−1). No cells are required to form this table, as table T is formed by manipulating the constants, wires and their bits. As shown in FIG. 3, table T consists of two parts, namely table T_n and table T_K. Table T_n is an N×n table consisting of binary representations of n-bit numbers 0,1, . . . ,N−1 following in natural order, $$T\_n = \begin{vmatrix} 0\ldots00 \\ 0\ldots01 \\ \ldots \\ 1\ldots11 \end{vmatrix}.$$

Table T_K is an N×M table with columns computed from N-bit vectors K_0, . . . ,K_(M−1) such that bits with 0 indices are arranged at the top of table T_K. Thus, each vector is arranged in a column so that a bit of the vector appears in each row. Table T is the conjunction of tables T_n and T_K, T=[T_n,T_K], and has N rows, denoted as V_0, V_1, . . . ,V_(N−1) starting from the top of the table. The rows in table T are thus denoted as V_i, where i=0, . . . ,N−1.

The first n bits in each vector V_i, when treated as a binary number, are equal exactly to i.

The values in table T illustrated in FIG. 3 is for the example given above, where n=2 (N=4) and m=2 (M=3). Vector K_0=0000, vector K_1=0110, and vector K_2=0100. Thus, the rows of table T are vectors V_0=00000, V_1=01011, V_2=10010 and V_3=11000.

Processor 102 further includes a balanced tree illustrated in FIG. 4. The tree is composed of a plurality of modules 130 arranged in hierarchical tiers, with each module having two 1-bit inputs u_i,u_j and two p-bit inputs V_i, V_j, where i=(0,2,4, . . . ,N−2) and j=(1,3,5, . . . ,N−1). Each module 130 is arranged to provide a 1-bit output u' and a p-bit output V'. Each module 130 computes u' as the disjunction of inputs u_i and u_j (i.e., u_i OR u_j), and V' is selected as V_i, if u_i is "1", or as V_j if u_i is "0":

u'=u_v u_j, and

V'=u_i V_i OR not(u_i) V_j.

Thus, the tree has N 1-bit inputs u_0,u_1, . . . u_(N−1) and N p-bit inputs V_0,V_1, . . . ,V_(N−1), and generates a 1-bit output u and a p-bit output V, where p=n+M.

Applying the tree of FIG. 4 to vector K, the N bits of vector K are denoted as K=(k_(N−1), . . . ,k_1,k_0) (from right to left). In the convention of identifying the tree of FIG. 4 by its size in terms of M, p and N, the tree is a BUS_3_5_4 tree, employing M_p modules 130 providing a p-bit vector V. Each module 130 provides a u'=1 output when a "1" appears in either (or both) k_i (now, u_i) and k_(i+1) (now u_j). If the values of both u_i and u_j are "0", u' is "0". In the example, vector K=1110, so k_0=0 and k_1=1 for inputs u_0 and u_1 to the first module 130a. Consequently, module 130a will produce a u'=1 output. Similarly, the k_2=1 and k_3=1 inputs to the next module 130b in the same level of the tree will provide a u'=1. The V' output from module 130a will be either p-bit vector V_0 or V_1, depending on the value of k_0. In the example, since k_0=0, the output from module 130a is V'=V_1. Similarly, module 130b will provide an output of V'=V_2. At the bottom module 130c (there being only two levels in this example), since the value of u_i=1, the output is p-bit vector V=V_1.

The first n bits of vector V are output as x_min. In the example, output vector V=V_1=01011, so x_min=01.

A "1" bit is added to the right (least significant) end of the remaining M bits of vector V to form an (M+1)-bit vector P. In the example, vector P=0111. Vector P is input to processor 104 to calculate y_min.

Processor 104 calculates y_min using vector P. More particularly, consider a table T_m that is identical to table T_n described above and shown in FIG. 3 except that it is m bits wide rather than n bits. If m=n, table T_m will be identical to table T_n. The rows of table T_m are denoted as U_0, U_1, U_(N−1) (instead of V_0, V_1, V_(N−1)). Processor 104 operates in the same manner as processor 102, using the M+1 bits of vector P for the u_i bits in the tree shown in FIG. 5 instead of the bits of vector K. In this case, however, the bits are numbered from left to right. The result is an m-bit output vector U, which is y_min.

Figure 5:
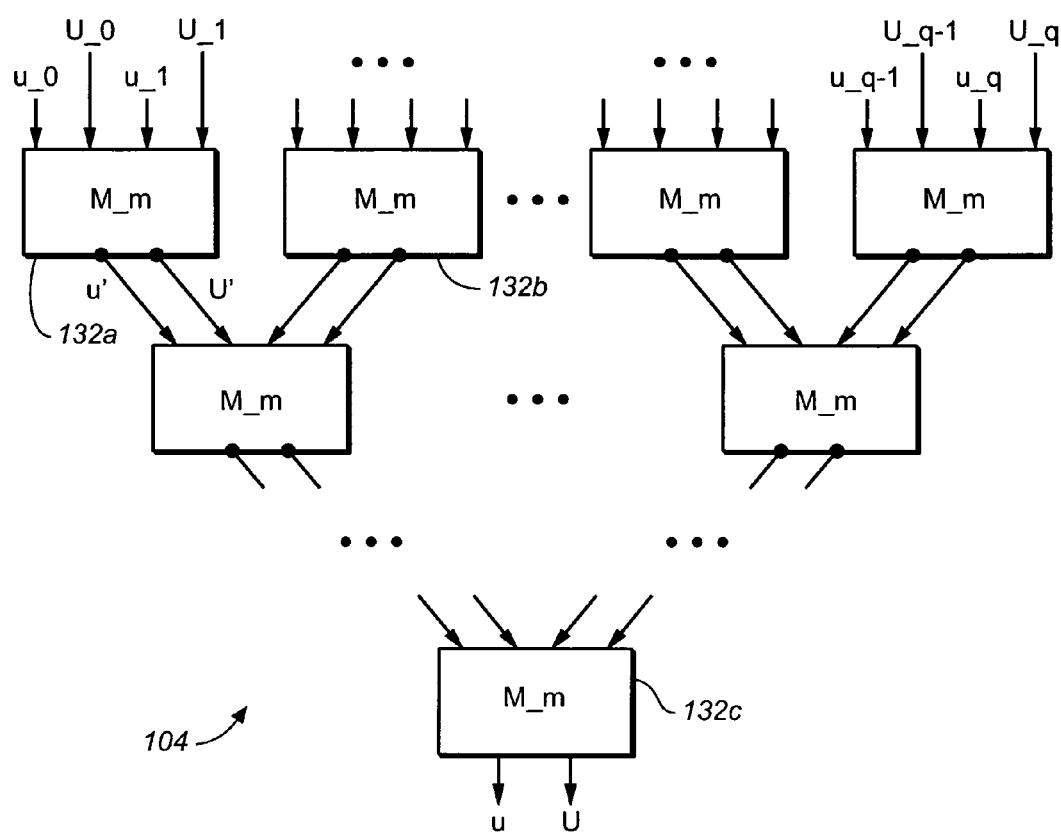
FIG. 5 is a block diagram of a tree used in the third processor of the circuit shown in FIG. 1.

Applying the example where m=n (so table T_m is identical to table T_n shown in FIG. 3), vector P is used to supply the u_i bits to the tree illustrated in FIG. 5. In this case, modules 132 receive the 1-bit values u_i and u_j derived from vector P, and the m-bit vectors U_0, . . . , U_(N−1). In the convention described above, each module 132 is a BUS_2_4 module. The tree illustrated in FIG. 5 operates in the same manner as the tree illustrated in FIG. 4. The first module 132a receives u_0=0 and u_1=1 to supply a vector U'=U_1 to module 132c. A second module 132b in the level with module 132a receives u_2=1 and u_3=1 to supply a vector U'=U_2 to module 132c. The result from module 132c will be m-bit-vector y_min=U=U_1=01.

The result, W_min, is the concatenation of x_min and y_min (w_min=(x_min, y_min). In the example, W_min=0101, which is the same as the minimum value on wire W_3 in the example.

As noted above, modules 126 calculate $2^m$-bit vectors ky_i. Consequently, it would be possible for select module 128 to calculate $2^m$ select signals. Instead, module 128 calculates $2^m-1$=M select signals, with the highest-index select signal (associated with $2^m$) being omitted. The addition of the "1" bit to the end of the vector derived by processor 102 creates vector P having $2^m$ bits, and insures that the right-most bit in vector P is a "1". This insures that processor 104, operating on the bits of vector P, will not generate a y_min greater than M−1. In the example of M=3, the "1" right-most bit of vector P insures that y_min will not be greater than "11".

It will be appreciated that the depth of processor 102 is 2n and that the depth of processor 104 is 2m (or 2n if m=n). As previously mentioned, the depth of processor 100 is 2 log S+n. Therefore, total depth of the circuit is $$2\log S + \frac{5}{2}a$$

and its width is equal to S(N+1/2M).

The maximum binary value W_max carried by a wire of array A can be identified in the same manner as calculating W_min with elementary (dual) changes in the circuit. W_max can also be calculated by inverting the inputs and locating the wire with minimum depth as described above. The result will be the inverted maximum value. For example, consider the example given above of a datapath module having four wires carrying binary signals of W_1=(1100)=12, W_2=(1001)=9, W_3=(0101)=5 and W_4=(1010)=10. The circuit as described will find W_min=(0101)=5, which is associated with wire W_3. To find the wire having maximum depth, the inputs can be inverted as $\overline{W\_1}$=(0011)=3, $\overline{W\_2}$=(0110)=6, $\overline{W\_3}$=(1010)=10, $\overline{W\_4}$=(0101)=5, and the circuit as described will find $\overline{W\_min}$=(0011). The result is inverted to find W_max=(1100)=12, which is associated with wire W_1.

Although the present invention has been described with reference to preferred embodiments, workers skilled in the art will recognize that changes may be made in form and detail without departing from the spirit and scope of the invention.

What is claimed is:

1. Apparatus for identifying a maximum or minimum value among a plurality of values represented by respective a-bit binary signals on a plurality of a-bit wide wires in an integrated circuit module, the apparatus comprising:

first means responsive to the a-bit binary signal on each of the plurality of wires to calculate an N-bit vector K based on n most significant bits of all a-bit binary signals and to calculate M N-bit vectors K_0, . . . , K_(M−1) based on the n most significant bits and m least significant bits of all a-bit binary signals, where n=a−m, N=$2^n$, M is at least $2^m-1$ and m is either a/2 or (a−1)/2;

second means responsive to vectors K_0, . . . ,K(M–1) for calculating N table vectors;

third means responsive to vector K for selecting one of the table vectors to derive a vector P;

fourth means responsive to vector P for selecting a table vector; and an output for calculating the minimum or maximum binary value from the vectors selected by the third and fourth means.

2. Apparatus of claim 1, wherein each a-bit binary signal is represented by a respective a-bit vector, W_1, . . . ,W_s, and the first means comprises:

a first segmenter for segmenting each a-bit vector into respective n-bit first portions and m-bit second portions, a first conjunctor responsive to the n-bit first portions for generating a plurality of N-bit vectors, kx, each having a bit in a position representing a value of the respective n-bit first portion, and a disjunctor responsive to the kx vectors for deriving vector K.

3. Apparatus of claim 2, wherein the first means further comprises:

a second conjunctor responsive to the m-bit second portions for generating a plurality of $2^m$-bit vectors each having a bit in a position representing a value of the respective m-bit second portion, a concatenator responsive to the $2^m$-bit vectors to generate select signals, and a multiplexer responsive to the kx vectors and to the select signals to generate vectors K_0, . . . ,K_(M–1).

4. Apparatus of claim 1, wherein the second means comprises:

a table containing vectors K_0, . . . ,K_(M–1) arranged in columns, with each row representing a respective table vector.

5. Apparatus of claim 4, wherein the table is a concatenation of a first N×n table of binary numbers arranged in order in rows starting from 0 and a second table formed of vectors K_0, . . . ,K_(M–1) arranged in columns such that there are N rows of n+M bits forming table vectors V_0, . . . ,V_(N–1).

6. Apparatus of claim 5, wherein the third means comprises:

a first hierarchical tree responsive to the bits of vector K to select one of table vectors V_0, . . . ,V_(N–1), and a third segmenter for segmenting the vector selected by the first tree into an n-bit code and an M-bit vector, and a generator for generating a vector P based on the M-bit vector.

7. Apparatus of claim 6, wherein the generator comprises:

a concatenator for concatenating a bit of predetermined value to the M-bit vector to form vector P.

8. Apparatus of claim 6, wherein the fourth means comprises:

a second table of binary numbers arranged in order in N rows starting from 0 such that each row contains m bits forming table vectors U_0, . . . ,U_(N–1), and a second hierarchical tree responsive to the bits of vector P to select one of the table vectors U_0, . . . ,U_(N–1) to derive an m-bit code.

9. Apparatus of claim 8, wherein the output includes:

a second concatenator for concatenating the n-bit code and the m-bit code.

10. Apparatus of claim 1, further including:

an inverter for inverting each vector W_1,W_2, . . . ,W_s, whereby the output identifies a maximum binary value.

11. A process of identifying a maximum or minimum binary value among a plurality of values represented by respective a-bit binary signals on a plurality of a-bit wide wires in an integrated circuit module, the process comprising steps of:

a) calculating an N-bit vector K based on n most significant bits of all a-bit binary signals, where n=a–m, $N=2^n$ and m is either a/2 or (a–1)/2;

b) calculating M N-bit vectors K_0, . . . ,K_(M–1) based on the n most significant and the m least significant bits of all a-bit binary signals, where M is at least $2^m$–1;

c) calculating N table vectors based on vectors K_0, . . . ,K(M–1);

d) selecting one of the table vectors based on vector K;

e) selecting a table vector based on a vector P derived from the table vector selected in step d); and f) identifying the minimum or maximum binary value among the plurality of values represented by the respective a-bit binary signals on the plurality of a-bit wide wires based on the vectors selected in steps d) and e).

12. The process of claim 11, wherein each a-bit binary signal is represented by a respective a-bit vector, W_1, . . . ,W_s, and step a) comprises steps of:

a1) segmenting each a-bit vector into respective n-bit first portions and m-bit second portions, a2) generating a plurality of N-bit vectors, kx, each having a bit in a position representing a value of the respective n-bit first portion, and a3) disjoining the kx vectors to derive vector K.

13. The process of claim 12, wherein step b) comprises steps of:

b1) generating a plurality of $2^m$-bit vectors each having a bit in a position representing a value of the respective m-bit second portion, b2) concatenating the $2^m$-bit vectors to generate select signals, and b3) multiplexing the kx vectors to the select signals to generate vectors K_0, . . . ,K_(M–1).

14. The process of claim 11, wherein step c) comprises steps of:

c1) arranging vectors K_0, . . . ,K_(M–1) in columns of a table, and c2) deriving table vectors from respective rows of the table.

15. The process of claim 14, wherein the table is formed by steps of:

forming a first table having n columns and N rows, the rows being arranged in order to contain binary values starting from 0, forming second table formed of vectors K_0, . . . ,K_(M–1) arranged in columns, and concatenating the first and second tables so that there are N rows of n+M bits forming table vectors V_0, . . . ,V_(N–1).

16. The process of claim 14, wherein step d) comprises steps of:

d1) selecting one of the table vectors V_0, . . . ,V_(N–1) using a hierarchical tree and bits of vector K, d2) segmenting the vector selected by the tree into an n-bit code and an M-bit vector, and d3) generating a vector P based on the M-bit vector.

17. The process of claim 16, wherein step d) further includes:

d4) concatenating a bit of predetermined value to the M-bit vector to form vector P.

18. The process of claim 16, step e) comprises steps of:
e1) forming a second table having m columns and N rows, the rows being arranged in order to contain binary values starting from 0, and
e2) selecting one of the table vectors $U\_0, \ldots, U\_(N-1)$ using a hierarchical tree and bits of vector P to derive an m-bit code.

19. The process of claim 18, wherein step f) comprises: concatenating the n-bit code and m-bit code.

20. The process of claim 11, further including, before step a):
inverting each vector $W\_1, W\_2, \ldots, W\_s$, whereby step f) calculates a maximum binary value.

* * * * *